United States Patent Office 3,505,270
Patented Apr. 7, 1970

3,505,270
MANUFACTURE OF PAPER PRODUCTS
Max H. Laden, Chicago, Ill., assignor to Swift & Company, Chicago, Ill., a corporation of Illinois
No Drawing. Filed June 3, 1966, Ser. No. 554,990
Int. Cl. C08f 31/00; D21h 01/28; C09j 03/14
U.S. Cl. 260—33.2          7 Claims

ABSTRACT OF THE DISCLOSURE

Novel water-soluble, hot-melt adhesive compositions possessing outstanding characteristics when used in the manufacture of rolled paper products, such as paper towels, toilet paper rolls, etc., are disclosed. These adhesive compositions comprise a viscous solution of a hydantoin-formaldehyde resin in a polyoxyalkylated alkyl phenol containing sufficient alkylene oxide groups to render the phenol water-soluble.

---

This invention relates to a novel water-soluble, hot melt adhesive composition. These compositions are utilized as "pickup" adhesives in the manufacture of rolled paper products such as paper towels, toilet paper rolls, etc.

In the manufacture of paper products, paper is rewound from large rolls onto cores of spiral wound chip boards at speeds frequently in excess of 1,500 ft. per minute. In order to pick up the paper at such high speeds, the adhesive, which is applied to the core by narrow glue wheels must be extremely tacky. Generally, those cold pick-up adhesives which possess desirable amounts of tack are too viscous at ambient temperatures to machine well under the conditions employed.

Because of the escalation in core speeds, hot melt adhesives were satisfactorily employed inasmuch as they possess sufficiently low viscosity at the application temperature and become very viscous and tacky upon cooling. However, such hot melt adhesives lack one important property for use in toilet paper and paper towel manufacture inasmuch as they are not water-soluble. In order to minimize paper waste in the production of paper rolls, the trimmings and discarded defective rolls may be repulped. If the adhesive used is not completely water-soluble, resin particles clog the screens of the paper-making machine and cause unsightly specks in the paper. Accordingly, almost all hot melt adhesives, being water-insoluble, pose problems in the manufacture of rolled paper products.

The ideal adhesive must therefore be water-soluble, be very viscous on cooling and must retain its tack for several minutes. This is extremely important in case of machine shut-down so that the adhesive will still pick up the tissue paper without fail when the rewinding operation is resumed. However, after the adhesive has "set," the bond between the paper and the core must be weak enough to permit separation without fiber tear so that rolls of the paper can be used to the last sheet. Further, the adhesive must be colorless for esthetic reasons and must not cause discoloration of the tissue paper.

It is therefore apparent that a commercial, colorless, water-soluble, hot melt adhesive which retains its tack for several minutes yet produces a weak bond with paper after a period of time would be a most welcome addition to the toilet paper and paper towel manufacture industry.

It is therefore an object of this invention to produce a novel, colorless, water-soluble, hot melt adhesive composition which is heat stable, and is nontoxic.

Another object of the invention is the production of an adhesive composition which sets instantly upon contact with paper cores at ambient temperatures to a very viscous film of high tack.

A further object of this invention is the production of a novel adhesive composition possessing paper penetrating properties so that after a short time the adhesive will migrate into the paper to the extent that the bond is starved and the tissue may then be released from the core without fiber tear.

Other objects and advantages of the present invention, if not specifically set forth herein, will be obvious to one skilled in the art upon a reading of the following description of the invention.

The objects of this invention may be accomplished by dissolving at an elevated temperature a water-soluble hydantoin-formaldehyde resin in a high boiling, heat stable, water-soluble surfactant of the polyoxyethylated alkyl phenol type possessing a hydrophilic-hydrophobic balance such that the resulting hot melt adhesive is water-soluble. Generally speaking, the adhesive composition may be formed by heating the hydantoin-formaldehyde resin and surfactant at a temperature of 200° to 250° F., preferably at 220° to 240° F., until complete solution is obtained. The resulting solution is then allowed to cool whereby a water-clear, very tacky, cold and hot water-soluble, hot melt adhesive is formed. The hot melt adhesive composition is very fluid at temperatures of 120° to 140° F. yet when it is applied at these temperatures to the chip board core, it becomes very viscous on cooling and retains its tack for several minutes.

Hydantoin-formaldehyde resins have been produced by various methods but, in general, these methods comprise the reaction of one mole of hydantoin with at least one mole of formaldehyde, and preferably at least two moles of formaldehyde, in the presence of an alkali metal compound. In one method, an hydantoin is reacted with at least two moles of formaldehyde in the presence of a soluble solvent and an alkali metal hydroxide. The reaction mixture is refluxed for a period of one to three hours, after which the solution is acidified with an acid such as acetic acid, and the excess formaldehyde and water evaporated off. The residual mass is at first a thin syrup which changes to a viscous liquid and finally to a solid if the heating is prolonged.

In another prior art method, hydantoin-formaldehyde resins may be formed by reacting formaldehyde and an hydantoin in the presence of a buffer salt taken from the group consisting of alkali metal salts of aliphatic mono-, and di-carboxylic acids containing not to exceed 5 carbon atoms, alkali metal salts of phosphoric acid, alkali metal salts of boric acid; the salt being present in sufficient amount such that the initial pH is not less than about 5. Generally, between about 1.05 and about 1.30 moles of formaldehyde per mole of an hydantoin is utilized, although a greater excess of formaldehyde may be employed.

Hydantoin, sometimes called glycolylurea, or imidazolediedione is a five-membered heterocyclic ring; and for purposes of this invention, hydrantoin or hydantoin-formaldehyde resin is to be construed to cover compositions wherein the number 5 carbon in the ring, that is, the carbon atom joined to the imino and carboxyl groups of the hydantoin ring, contains hydrogen or is substituted with monovalent aliphatic or cycloaliphatic groups. More specifically, hydantoins of the following formula may be utilized in this invention:

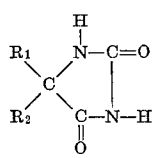

wherein $R_1$ and $R_2$ may be the same or different and are hydrogen, monovalent alkyl, such as: methyl, ethyl, propyl, butyl, pentyl, hexyl, etc., or alkoxy, such as: methoxy ethoxy, propoxy, buthoxy, etc. $R_1$ and $R_2$ can also be a monovalent cycloaliphatic radical, such as: cyclopentyl and cyclohexyl. Alternatively, $R_1$ and $R_2$ may together form a divalent aliphatic or cycloaliphatic group, as in the 5-disubstituted hydantoin derived from cyclohexanone, or cyclopentanone. It is preferred to use the 5,5-dialkyl hydantoins, or specifically 5,5-dimethyl hydantoin which can be easily made by reacting acetone cyanhydrin with ammonium carbonate.

In one prior art method, air is blown through the reaction mass during the evaporation of the water and excess formaldehyde so as to improved the results from the standpoint of a higher resin melting point and increased molecular weight. The air is preferably blown through the mass after the temperature of the liquid during evaporation has reached at least 120° C. In general, the dimethyl hydantoin-formaldehyde resins utilized in this invention range from water-white to amber in color and contain a slight formaldehyde odor. They normally exist as brittle lumps and have an average molecular weight of 240 to 300, with an initial softening point range of 60° C. to 80° C. A specific embodiment of the invention utilizes Dantoin 684 (produced by Glyco Chemicals, Inc.) which is dimethyl hydantoin-formaldehyde resin having an average molecular weight of 240 to 300, and possessing an initial softening point of 59° to 80° C., is water-white in color, possessing a faint formaldehyde odor, and exists in brittle lumps having a density of about 1.30 grams per ml. Dantoin 684 is soluble in such volatile solvents as methanol, ethylacetate, methyl ethyl ketone, chloroform, methylene chloride, and hot glycerol. It is insoluble in benzene, xylene, petroleum ether, diethyl ether, trichloroethylene, and carbon tetrachloride.

In the event that a slight amount of free formaldehyde in the hydantoin-formaldehyde resin is considered objectionable, it is possible to remove this formaldehyde by addition of an amide such as urea or toluene sulfonamide. This may be accomplished by refluxing an aqueous resin solution with a small percentage of from, e.g., 10% or less of the desired amide.

In accordance with the teachings of this invention, the hydantoin-formaldehyde resin is dissolved in a polyoxyalkylated alkyl phenol. Since the polyoxyalkylated alkyl phenols are not classified as solvents but normally as surfactants, and since hydantoin-formaldehyde resins are insoluble in a wide range of organic solvents, it was quite unexpected to find that dimethyl hydantoin-formaldehyde resins would dissolve in polyoxyalklated alkyl phenol type surfactants. Furthermore, in those instances where dimethyl hydantoin-formaldehyde resin is soluble in some organic solvents, these solutions are completely unsatisfactory for use in hot melt pickup adhesives on paper cores used in the manufacture of tissue paper and paper towel rolls because of their high volatility. Contrary to the low viscosities of concentrated solutions of dimethyl hydantoin-formaldehyde resin in water, methanol, ethylacetate, etc., solutions of dimethyl hydantoin-formaldehyde resin in polyoxalkylalkylated phenols have an unexpectedly high viscosity. For example, at 80° F. a 57% solution of dimethyl hydantoin-formaldehyde resin in polyoxyethylated nonyl phenol containing 63% ethylene oxide possesses a viscosity of 60,000 centipoises; yet, at 120° F. (the temperature at which the adhesive is applied) the same 57% solution has a viscosity of only 3,500 centipoises.

The preferred polyoxyalkylated component of the adhesive composition of this invention may best be described as the reaction product of mono-, di-, or trialkyl substituted phenols with a sufficient amount of ethylene oxide to render the substance water-soluble. The minimum ratio of ethylene oxide to alkyl phenol is about 63%. Below this percentage the hydrophilic-hydrophobic balance results in decreased water-solubility and increased solubility in water-immersible solvents. Generally a maximum of 71% ethylene oxide will be used. Based on nonyl phenol, this will average between about 9 and 11 moles of ethylene oxide.

The alkyl phenol which may be ethoxylated may be defined as phenols containing 1-3 alkyl groups having 6 to 24 carbons per alkyl group. When ethoxylated to the desired amount, they are usually clear liquids having viscosities of 1.5 to 6 poises. Specific embodiments include Solar NP (Swift & Company) and Igepal CO-630 (General Aniline and Film Corporation), both of which are ethoxylated nonyl phenols containing over 63% ethylene oxide. These are clear, straw-colored liquids having viscosities of 1.5 to 6 poises at 25° C., cloud points of 63° to 67° C. (1% solution in distilled water), and a specific gravity of 1.06 to 1.07. They have good heat stability and are completely soluble in cold and hot water.

The unusual temperature/viscosity coefficient, the low evaporation rate, heat stability, water solubility, nontoxicity, light color and unusual solvency characteristics for the dimethyl hydantoin-formaldehyde resin and polyethoxylated alkyl phenols are not exhibited by any other known commercial adhesive presently used as a "hot pickup' adhesive for rewinding tissue paper. Because of the unusual temperature/viscosity coefficient, the adhesive sets instantly upon contact with the paper core at ambient temperatures to a very viscous film of high tack. Because of this high viscosity, it does not penetrate into the paper immediately but remains sufficiently tacky for several minutes to permit the rewinding operation after machine shut down. However, due to the wetting properties of the polyoxyethylated components of the adhesive, the adhesive migrates completely into the paper core within a few hours and ceases to form a bond between the core and tissue paper; thus, the tissue can be used to the last sheet without any fiber tear. Generally speaking, the adhesive is deposited in a layer ranging from .5 mil to about 3 mils in thickness. The migration of the adhesive into the core is a function of the thickness of the adhesive layer and the absorbency of the paper; but, in general, the solvent will have migrated into the core within 12 hours if the adhesive layer is about 1 mil in thickness. Further, the higher the viscosity of the adhesive after contact with the core, the longer it will take to migrate into the paper.

The water-soluble, hot melt adhesives of this composition are produced by adding the dimethyl hydantoin-formaldehyde resin to the alkyl phenoxypoly (ethyleneoxy) ethanols in a ratio of 1:4 to 4:1 by weight, and heating the mixture to a temperature of about 200° F. to 240° F. until a complete solution is obtained. Generally, however, it is preferred that the adhesive composition contain at least 50% by weight of the hydantoin-formaldehyde resin and preferably over 55% by weight of the resin. Upon cooling, the solution is a clear, water-white, very viscous, very tacky liquid which is soluble in both hot and cold water. While the hot melt is extremely viscous at room temperature, it nevertheless becomes quite fluid at temperatures above about 120° F. The following examples are presented to illustrate the invention. It will be understood that these examples are illustrative only and should not be taken in any manner as limiting the invention as defined by the appending claims.

EXAMPLE I 57 parts of Dantoin 684 (dimethyl hydantoin-formaldehyde resin) is added to 43 parts by weight of polyoxyethylated nonyl phenol containing 63% ethylene oxide. The mixture was heated to about 220° to 230° F. until a uniform solution was obtained. The Dantoin 684 is a brittle, white to amber resin possessing a faint formaldehyde odor. It has initial softening point of 59° C.–80° C., an average molecular weight of 240 to 300, a density of 1.30, and the pH is 6.5 to 7.5. After heating for the required amount of time, the hot melt adhesive thus produced was found to be water-clear in color, very viscous, and a very tacky substance which became very fluid at 120° F. to 140° F. Its viscosity at 80° F. is 600 poises; at 120° F., it is 35 poises; and, at 200° F. it is 1.5 poises.

The hot melt adhesive produced in this example was applied about 1–2 mils thick to paper cores by narrow glue wheels at a temperature of 140° to 150° F. This adhesive enabled the cores to pick up toilet tissue paper at rewind speeds in excess of 1,500 ft. per minute. Paper rolls produced using this adhesive released from the core without any fiber tear after about 12 hours, and showed no discoloration of the paper. No difficulties were encountered in repulping; and, there was no residual adhesive left on the screen and no undispersed resin particles noticed in the paper.

EXAMPLE II 43 parts of Solar NP (65% ethylene oxide adduct of nonyl phenol) were heated with 57 parts by weight of Dantoin 684 for two hours at 230° F. The resulting hot melt adhesive was hot and cold water-soluble and performed in a manner similar to the adhesive of Example I. The adhesive, however, had a slightly lower viscosity. At 80° F., it possessed a viscosity of 590 poises; at 120° F., it possessed a viscosity of 32 poises; and, at 200° F., it possessed a viscosity of 1.4 poises.

EXAMPLE III

In order to determine the heat stability of the water-soluble hot melt, a solution comprising 37 parts Dantoin 684 and 63 parts by weight of Solar NP was prepared. Since this was a dilute solution, its viscosity at 80° F. was only 178 poises. After heating to 240° F. for 24 hours, it was again cooled to 80° F., and its viscosity was found to be 170 poises, showing that the adhesive had excellent heat stability.

Obviously many modifications and variations of the invention as hereinbefore set forth may be made without departing from the spirit and scope thereof, and therefore only such limitations should be imposed as are indicated in the appended claims.

I claim:
1. As a composition of matter, a water-soluble, hot-melt adhesive having the property of being quite viscous at ambient temperature which comprises between about 20% and about 80%, by weight, of a dialkyl hydantoin-formaldehyde resin dissolved in between about 20% to 80% of an ethoxylated alkyl phenol wherein the phenol contains 1–3 alkyl groups having 6 to 24 carbons per alkyl group and a minimum ratio of ethylene oxide to alkyl phenol of about 63%.

2. The composition of claim 1 wherein the hydantoin is 5,5-dimethyl hydantoin.

3. The composition of claim 1 wherein the phenol is ethoxylated nonyl phenol.

4. The composition of claim 1 wherein the composition comprises over 55%, by weight, of 5,5-dimethyl hydantoin and the remainder is ethoxylated nonyl phenol.

5. In a method of winding paper upon cores wherein an adhesive is deposited upon a core so that it will pick up paper, the improvement comprising applying to the core a water-soluble, hot-melt adhesive having the composition defined by claim 1.

6. The method of claim 5 wherein the hydantoin is 5,5-dimethyl hydantoin and the phenol is ethoxylated nonyl phenol.

7. The method of claim 5 wherein the adhesive is applied to the core in a film of from about .5 to about 3 mils so that after a few hours, a releasable bond will be formed between the core and the picked-up paper which will permit separation of the paper from the core without any substantial fiber tear.

References Cited

UNITED STATES PATENTS

| 2,850,471 | 9/1958 | Klein | 260—33.2 |
| 3,257,348 | 6/1966 | Epes | 260—33.2 |
| 3,346,530 | 10/1967 | Martins | 260—33.2 |
| 3,098,834 | 7/1963 | Jarabek | 260—33.2 |
| 2,532,278 | 12/1950 | Chadwick | 260—67.5 |
| 2,155,863 | 4/1939 | Jacobson | 260—67.5 |

OTHER REFERENCES

Rubber World, Materials and Compounding Ingredients for Rubber and Plastics, 1965, p. 696.

Du Pont, New Products Bulletin, No. 26, July 29, 1948, pp. 1, 2, 3.

Schwartz and Perry, "Surface Active Agents," vol. 1, Interscience, New York, 1949, pp. 202–203.

MORRIS LIEBMAN, Primary Examiner

H. H. FLETCHER, Assistant Examiner

U.S. Cl. X.R.

117—155; 156—187, 331; 161—263; 260—67.5